Figure 1:
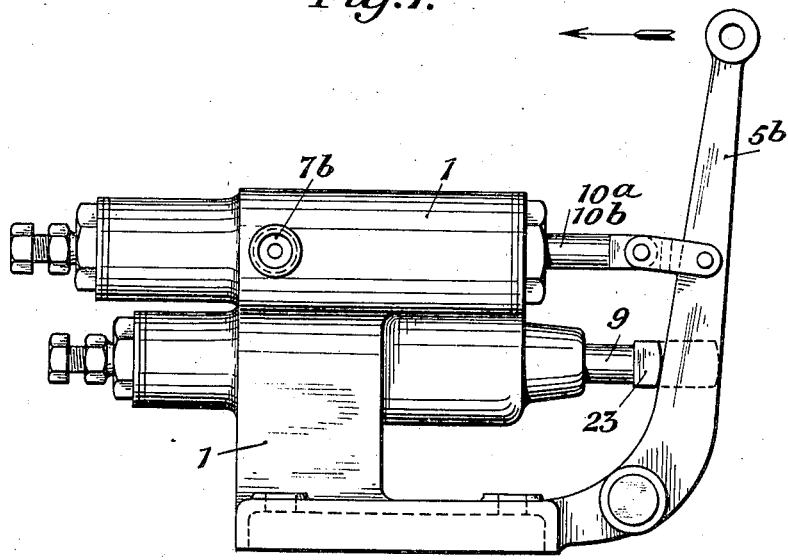

Feb. 2, 1932.  P. KARSTEN  1,843,425
BRAKE VALVE
Filed Sept. 12, 1929   3 Sheets-Sheet 1

INVENTOR:
Peter Karsten
BY
Lotta, Kehlenbeck & Farley
ATTORNEYS

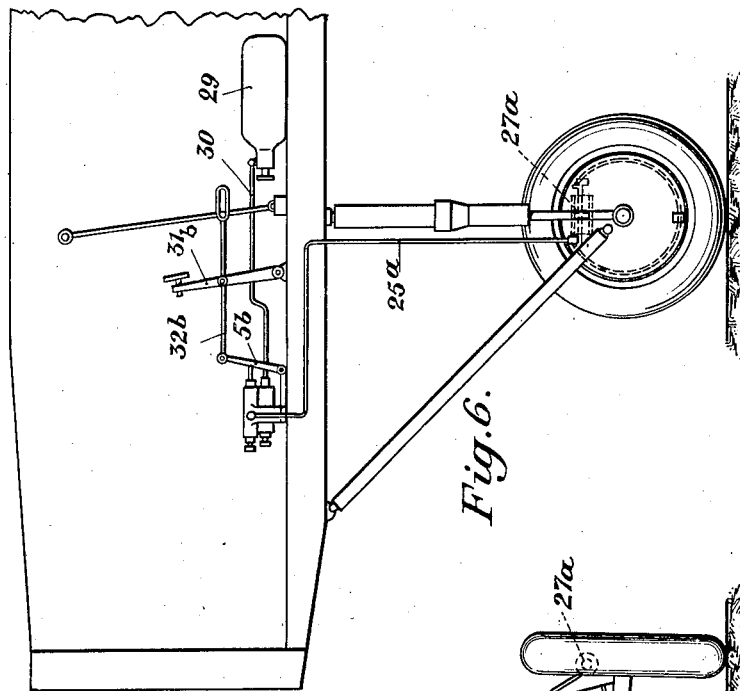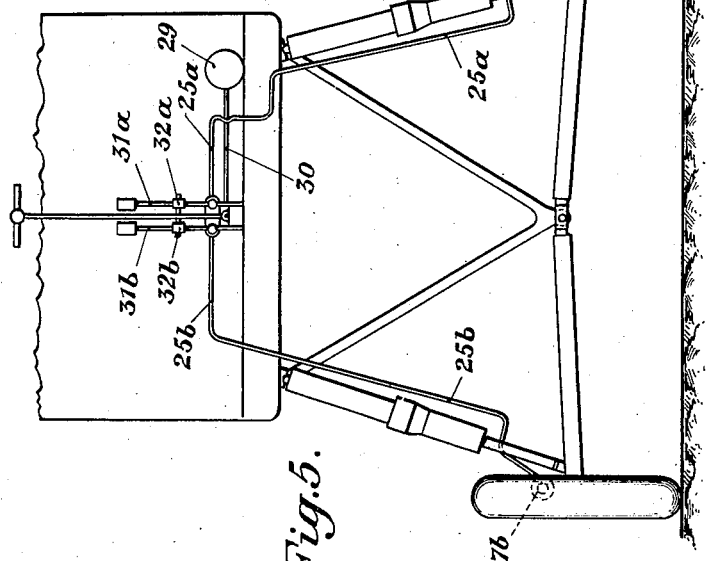

Patented Feb. 2, 1932

1,843,425

UNITED STATES PATENT OFFICE

PETER KARSTEN, OF DUSSELDORF, GERMANY, ASSIGNOR TO RHEINISCHE METALL-WAAREN- UND MASCHINENFABRIK SOMMERDA AKTIENGESELLSCHAFT, OF SOMMERDA, GERMANY, A CORPORATION OF GERMANY, AND FRITZ FAUDI, OF SOMMERDA, GERMANY

BRAKE VALVE

Application filed September 12, 1929, Serial No. 392,049, and in Germany October 10, 1928.

By means of the known braking devices for the wheeled carriages of aeroplanes either both wheels of one shaft may be braked equally powerful or each of the two wheels may be subjected to a different braking action to be able in this manner to steer the aeroplane. Such braking devices, using compressed air or compressed oil, as a rule comprise a brake, a braking cylinder and a brake pressure regulating valve for each wheel. Each of these brake pressure controlling or regulating valves is adjusted by a particular absolutely independent brake lever, so that the brake of each wheel is actuated perfectly independent of the brake of the other wheel.

Constructions are also known in which a single brake lever acts upon both brake valves and simultaneously opens or closes both brake valves when shifted in the longitudinal direction of the aeroplane, whereas the one brake valve is closed and the other opened and vice versa, when said brake lever is shifted across the longitudinal axis of the aeroplane.

With brake devices of this kind it is very difficult to exert an equally high brake pressure upon both wheels of one shaft, necessary to obtain running out of the aeroplane in a straight line, so that usually the aeroplane will run out in a serpentine line.

This disadvantage is removed by the brake valve arrangement according to the present invention which serves the purpose to supply the brake cylinders of the one or the other brake cylinder with the compressed air, necessary for effecting the braking, in such a manner, that the required braking conditions are assured and that, during a simultaneous braking of both wheels, the same braking action is exerted upon both wheels. The arrangement according to the invention simultaneously serves to always accommodate the effective brake pressure to requirements.

The change of the height of pressure in the brake cylinders is obtained by the movement of one of the two brake levers corresponding to the two wheels in such a manner, that, during a simultaneous braking of both wheels in which case both levers must be shifted, the lever shifted furthest determines the height of the pressure of the compressed air which then equally adjusts in both brake cylinders. The new device further allows the more or less powerful braking of one wheel alone for which purpose the brake lever belonging to this wheel is shifted, while the other lever remains in the position of rest so that no braking effect is exerted upon the other wheel.

For actuating the whole braking device a single pressure controlling valve only is required. Compressed air the pressure of which is adjusted by the control valve is supplied to each wheel brake by means of an inlet and an exhaust valve. The valve arrangement according to the invention therefore comprises a pressure regulating valve, two inlet valves, two exhaust valves and two brake levers which preferably are combined in and at a casing and influence each other in the manner indicated above.

In the accompanying drawings one construction of the valve arrangement according to the invention is shown by way of example.

Figure 2:
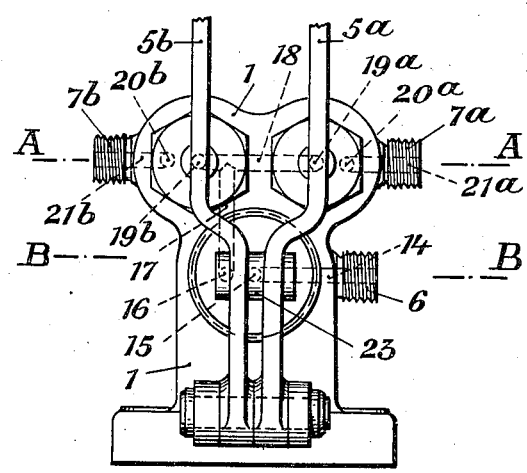
Figure 3:
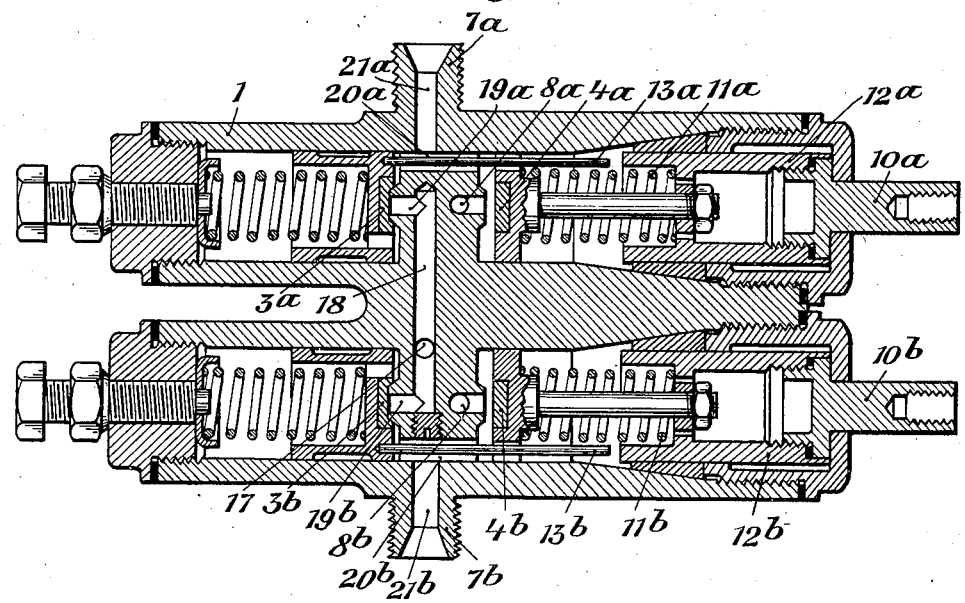
Figure 4:
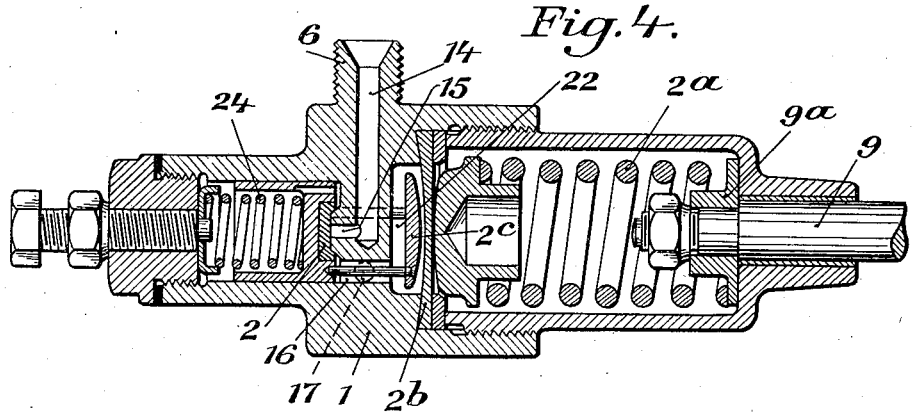

Figure 1 is a side elevation of the brake valve arrangement according to the invention; Figure 2 shows a front elevation of the device illustrated in Figure 1; Figure 3 is a section on line A—A of Figure 2; Figure 4 is a section on line B—B of Figure 2; and Figs. 5 and 6 are fragmentary end and side elevations respectively of an aeroplane equipped with the novel features.

All the valves of the brake device are enclosed in a casing 1. In Figure 4, 2 is the pressure regulating valve common to the brake cylinders of both wheels, 2a is the corresponding control spring and 2b designates the relief piston formed as a diaphragm. As will be seen from Figure 3, the two inlet valves are designated 3a and 3b, whereas the two exhaust valves carry the references 4a and 4b. The two brake levers are designated 5a and 5b.

The compressed air pipe 30 coming from a brake air container 29, shown in Figs. 5 and 6 of the drawings, communicates with a connection 6 (Figures 2 and 4), whereas, as shown in Figures 2 and 3, the two pipes 25ª, 25ᵇ leading to the brake cylinders 27ᵃ, 27ᵇ are in communication with the connections 7a and 7b. The two holes 8a and 8b which may be closed by the exhaust valves 4a and 4b lead to the atmosphere.

To effect the braking, the two brake levers 5a and 5b are moved by the pedals 31ᵃ and 31ᵇ and links 32ᵃ and 32ᵇ in the direction of the arrow shown in Figure 1. The rods 9, 10a and 10b are thereby pushed into the casing, as will be seen from the drawings. By the inward movement of the rods 10a and 10b first of all the exhaust valves 4a and 4b are closed under the action of the springs 11a and 11b.

If after the closure of the valves 4a and 4b the rods 10a and 10b are still further pushed into the casing, the end surfaces of the guiding members 12a and 12b press against the pins 13a and 13b which are moved in the longitudinal direction and cause opening of the inlet valves 3a, 3b the springs of which are compressed.

As both brake levers 5a and 5b bear against the rod 9, this latter is moved into the casing 1 together with the rods 10a and 10b. The movement of the rod 9 with its spring plate 9a causes at first, that the spring 2a, inserted under light tension, is further tensioned. After the brake levers have been shifted so far from their position of rest, that the exhaust valves are closed and the inlet valves are opened, the tension of the spring 2a and the hereby effected bending of the diaphragm is so great, that the diaphragm abuts against the plate 2c connected to the pressure regulating valve 2 which then is opened.

The high pressure air stored in the compressed air container 29 now flows by way of the ducts 30, 14, 15, the valve 2, the ducts 16, 17, 18, 19a, 19b the valves 3a, 3b and the ducts 20a, 20b, 21a, 21b, 25ᵃ, 25ᵇ, into the brake cylinders.

The rise of pressure is, by way of the duct 16, also propagated to the space 22 one side of which is closed by the diaphragm 2b. The pressure prevailing in the brake cylinder therefore acts upon the diaphragm 2b which is moved backwardly against the action of the regulating spring 2a, so that the valve spring 24 which constantly presses the pressure plate 2c of the valve 2 against the diaphragm 2b may automatically close the regulating valve 2 as soon as a certain brake pressure is reached.

The more the spring 2a is compressed by one or both brake levers 5a, 5b and the more it is pressed against the diaphragm 2c, the higher will be the pressure of the brake air under which the valve 2 automatically closes.

The head 23 of the rod 9 is, as will be seen from Figures 1 and 2, provided with two slots in each of which one of the two brake levers 5a and 5b is arranged. If one of the two brake levers is shifted further than the other, the position of the rod 9 and therefore the brake pressure will be determined by the position of the rod which has been shifted further.

If now the brake lever 5a or the brake lever 5b only is shifted, the brake air flows to that brake cylinder only which communicates with the connection 21a or with the connection 21b, so that in this case one of the two wheels only will be braked.

On release of the brake, the air escapes by way of the valves 4a and 4b and by way of the exhaust openings 8a and 8b.

Of course, the invention is not limited to the use in combination with the wheeled under-carriage of aeroplanes, but may be employed in other cases in which the same conditions are to be fulfilled for the steering and braking of the wheels arranged upon one shaft.

What I claim is:

1. In a brake valve arrangement of compressed air brakes for wheels, particularly for the wheels of aeroplane-under-carriages, in combination a brake cylinder for each wheel of one shaft of said under-carriage, inlet and exhaust valves arranged in co-operating groups for each of said brake cylinders, a lever for each group of said valves and a control valve common to both said brake cylinders and capable of being actuated by either of said levers, said control valve regulating the brake pressure acting in each of said brake cylinders and each of said levers being capable of independently adjusting the position of said valves for the supply of compressed air to the said brake cylinders.

2. In a brake valve arrangement of compressed air brakes for wheels, particularly for the wheels of aeroplane-under-carriages, in combination a brake cylinder for each wheel of one shaft of said under-carriage, inlet and exhaust valves arranged in co-operating groups for each of said brake cylinders, a lever for each group of said valves, a control valve common to both said brake cylinders, said levers being connected to a rod of said regulating valve by slot connections in such a manner, that said regulating valve may be operated by both brake levers simultaneously and by either of the two levers which has been moved furthest.

3. In a brake valve arrangement of compressed air brakes for wheels, particularly for the wheels of aeroplane-under-carriages, in combination a brake cylinder for each wheel of one shaft of said aeroplane-carriage, a spring actuated inlet valve for each of said brake cylinders, a spring actuated exhaust valve for each of said brake cylinders, means for connecting said inlet valve to said exhaust valve of each of said brake cylinders, a lever actuating the valves of one brake cylinder, another lever independently operating said valves of said other brake cylinder, a control valve common to both said brake cylinders, a spring for restoring said control valve to its normal position, said levers being connected to a rod of said regulating valve by slot connections in such a manner, that during the movement of said levers for effecting a braking action said inlet and exhaust valves are first shifted and then said control valve is displaced, whereas during a return movement of said levers the said control valve is returned by said spring to its normal position first, whereupon said inlet valves and said exhaust valves also are subsequently returned to their exit position.

In testimony whereof I have affixed my signature.

PETER KARSTEN.